(12) United States Patent
Gartner et al.

(10) Patent No.: US 7,998,267 B2
(45) Date of Patent: Aug. 16, 2011

(54) ADDITIVES FOR CEMENT

(75) Inventors: Ellis Gartner, Lyons (FR); Vincent Morin, Lyons (FR)

(73) Assignee: LAFARGE, Paris (FR)

( * ) Notice: Subject to any disclaimer, the term of this patent is extended or adjusted under 35 U.S.C. 154(b) by 0 days.

(21) Appl. No.: 12/934,613

(22) PCT Filed: Mar. 24, 2009

(86) PCT No.: PCT/IB2009/005415
§ 371 (c)(1),
(2), (4) Date: Sep. 24, 2010

(87) PCT Pub. No.: WO2009/118652
PCT Pub. Date: Oct. 1, 2009

(65) Prior Publication Data
US 2011/0041736 A1 Feb. 24, 2011

(30) Foreign Application Priority Data

Mar. 28, 2008 (EP) .................................. 08356056

(51) Int. Cl.
C04B 22/08 (2006.01)
C04B 24/12 (2006.01)
C04B 28/06 (2006.01)

(52) U.S. Cl. ........ 106/692; 106/693; 106/695; 106/696; 106/808

(58) Field of Classification Search ................. 106/692, 106/693, 695, 696, 808
See application file for complete search history.

(56) References Cited

U.S. PATENT DOCUMENTS

| | | |
|---|---|---|
| 3,801,338 A | 4/1974 | Whitaker |
| 4,318,744 A | 3/1982 | Dodson |
| 4,373,956 A | 2/1983 | Rosskopf |
| 4,990,190 A * | 2/1991 | Myers et al. .................. 106/727 |
| 5,017,234 A | 5/1991 | Gartner et al. |
| 5,641,352 A * | 6/1997 | Jeknavorian et al. ......... 106/808 |
| 7,182,808 B2 * | 2/2007 | Angelskaar et al. .......... 106/823 |
| 7,850,776 B2 * | 12/2010 | Gartner et al. ................ 106/692 |
| 2004/0244655 A1 * | 12/2004 | Buerge et al. ................. 106/823 |
| 2007/0266903 A1 | 11/2007 | Gartner et al. |

FOREIGN PATENT DOCUMENTS

| | | | |
|---|---|---|---|
| CN | 1241545 A | * | 1/2000 |
| JP | 55-75748 A | * | 6/1980 |
| JP | 2004-284865 | | 10/2004 |
| WO | WO 99/02465 | | 1/1999 |
| WO | WO 03/054346 | | 7/2003 |

OTHER PUBLICATIONS

Zhang Jusong et al.; "The influence of TiO2 on the formation of Belite-Calcium Sulfoaluminate Cement"; Cement Guide for New Epoch No. 3; pp. 17-19; 2002.

Woo-Hyeong Chae et al.; "Early Hydratation of modified Belite Cement prepared by adding Borax"; The Korean Journal of Chemistry 2 (3) pp. 147-151; 1996.

Kuroda, Takeshi et al.; "Cement Compositions"; Chemical abstracts, vol. 107, No. 10 ; Sep. 7, 1987; XP 000061613.

* cited by examiner

*Primary Examiner* — Anthony Green
(74) *Attorney, Agent, or Firm* — Pillsbury Winthrop Shaw Pittman, LLP

(57) ABSTRACT

A belite-calcium sulphoaluminate-ferrite (BCSAF) cement composition including: a BCSAF clinker which clinker has the following mineralogical composition, based on the total weight of the clinker: 5 to 25%, preferably 10 to 20%, of a calcium aluminoferrite phase having the general formula $C_2A_xF_{(1-x)}$, wherein X is from 0.2 to 0.8; 15 to 35% of a calcium sulphoaluminate phase; 40 to 75% of belite ($C_2S$); from 0.01 to 10% in total of one or more minor phases selected from calcium sulphates, alkali metal sulphates, perovskite, calcium aluminates, gehlenite, free lime and periclase and/or a vitreous phase; and an alkanolamine.

17 Claims, No Drawings

ADDITIVES FOR CEMENT

CROSS-REFERENCE TO RELATED APPLICATIONS

This is the U.S. National Stage of PCT/IB2009/005415, filed Mar. 24, 2009, which in turn claims priority to European Patent Application No. 08356056.5, filed Mar. 28, 2008, the entire contents of all applications are incorporated herein by reference in their entireties.

The present invention relates to additives for cement, in particular belite-calcium sulphoaluminate-ferrite cements.

Most modern concretes are made with hydraulic cements generally using Portland cement.

Portland cement is an hydraulic cement produced by pulverising Portland cement clinker, usually with small additions of calcium sulphate. The clinker is made by heating the specified mixture of raw materials (finely divided, intimately mixed and homogeneous) containing CaO, $SiO_2$, $Al_2O_3$ and other materials to temperatures close to or greater than 1400° C. The main CaO source is usually calcium carbonate in the form of limestone.

The clinker, produced in the form of hard nodules, contains at least two-thirds by mass of calcium silicates (tricalcium silicate, alite, $(CaO)_3.SiO_2$ and dicalcium silicate, belite, $(CaO)_2.SiO_2$; and current practice in most cement plants is for more than 60% of the clinker to be tricalcium silicate); tricalcium aluminate and tetracalcium aluminoferrite.

These four principal constituent components of Portland clinker are conventionally abbreviated to:
$C_3S$ (tricalcium silicate);
$C_2S$ (dicalcium silicate);
$C_3A$ (tricalcium aluminate); and
$C_4AF$ (tetracalcium aluminoferrite).

In this specification, including the accompanying claims, unless otherwise specified, the following terms are used to designate the mineral components of cement.
C represents CaO,
A represents $Al_2O_3$,
F represents $Fe_2O_3$,
S represents $SiO_2$,
$ represents $SO_3$.

The production of Portland cement results in the production of carbon dioxide: the carbon-containing fuel required to generate the high temperatures (about 1400° C.) required for sintering is oxidised to carbon dioxide ($CO_2$); and the calcium carbonate is calcined during the process in an endothermic reaction to form calcium oxide and carbon dioxide.

In recent decades the level of carbon dioxide in the atmosphere has increased considerably and continues to grow. The climatic effects of the increase have given rise to concern and it is desirable to reduce carbon dioxide emissions. The cement industry is responsible for about 5% of all industrial emissions of $CO_2$.

A mixture of raw materials rich in limestone is required to obtain a Portland cement clinker rich in alite (which is an impure form of $C_3S$). $CO_2$ emissions in Portland cement clinker production could be reduced by about 10% if the $C_3S$ component of Portland cement clinker were almost totally eliminated. This could be done if the quantity of limestone in the raw material were reduced by about 10%; the quantity of $CO_2$ released from limestone during calcination to calcium oxide would then be reduced, as would the amount of fuel necessary to supply the energy for this endothermic conversion. However $C_3S$ is the most important constituent of Portland cement and to a great extent controls its setting and hardening.

Portland cement clinkers with a low alite content are rich in belite (which is an impure form of $C_2S$). However belite-rich Portland cements do not afford sufficient short term strength to meet standard requirements and do not achieve the performance required for modern concrete applications.

Other types of cement are known, the production of which generate less $CO_2$ than Portland cement. Cements based on calcium sulphoaluminates, abbreviated to CSA, are important because they can be produced with lower industrial $CO_2$ emission and without having to use expensive raw materials. Sulphoaluminate cements comprise a calcium sulphoaluminate $C_4A_3\$$ phase, known as "Klein salt" or "ye'elimite", which makes it possible to obtain substantial early compressive strength.

It is known to use "alkanolamines" such as for example diethanolamine and triethanolamine as accelerators to shorten the setting time and to increase the early-age (e.g. one-day) compressive strength of concrete containing Portland cement. It has been reported that triethanolamine at low dosages (typically <0.03%) is used as a grinding aid for Portland cement Clinker. It is also known to use certain calcium salts as accelerators for setting and hardening in Portland cement. It has been reported that the acceleration by calcium chloride is essentially catalytic and it is the $C_3S$ which is most affected.

It has now been discovered that an alkanolamine can be used to modify the properties of a belite-calcium sulphoaluminate-ferrite containing cement (hereinafter referred to as a BCSAF cement) in order to improve the later-age strength, especially greater than 30 days, properties of the cement and of mortar and concrete containing it. The use of a calcium salt in association with an alkanolamine can also provide additional strength enhancement, especially at later-age. The present invention seeks to provide a BCSAF cement mix which affords, in hydraulic binders containing it, rheological and mechanical strength properties comparable with those of conventional Portland cement and/or which provides an increased 28-day and/or 90-day compressive strength in mortar and concrete containing it.

The present invention accordingly provides a BCSAF cement composition comprising: a BCSAF clinker which clinker has the following mineralogical composition, based on the total weight of the clinker:
5 to 30%, preferably 10 to 20%, of a calcium aluminoferrite phase having the general formula $C_2A_XF_{(1-X)}$, wherein X is from 0.2 to 0.8;
10 to 35% of a calcium sulphoaluminate phase;
40 to 75%, preferably 45 to 65%, belite ($C_2S$);
from 0.01 to 10% in total of one or more minor phases selected from calcium
sulphates, alkali metal sulphates, perovskite, calcium aluminates, gehlenite, free lime and periclase and/or a vitreous phase such as a blast furnace slag or a hydraulic glass; and
an alkanolamine.

The alkanolamine of the BCSAF cement composition according to the invention preferably may have the general formula:

$$NX_pR_{(3-p)} \tag{I}$$

in which p represents an integer from 1 to 3, R represents a hydrogen atom or an alkyl group of general formula:

$$-C_qH_{2q+1} \tag{II}$$

in which q represents an integer from 1 to 5;
X represents a group of the general formula:

$$-(C_nH_{2n})-OA \tag{III}$$

in which n is an integer from 2 to 5 and —($C_nH_{2n}$)— may be linear or branched;
or X represents a group of the general formula:

—($C_mH_{2m}$)—NY$_t$R$_{(2-t)}$ (IV)

in which m is an integer from 2 to 5, Y represents a group of general formula (III) as hereinbefore defined, t is 1 or 2 and the —($C_mH_{2m}$)— may be linear or branched.

Most preferably, p represents the integer 2 or 3.

Most preferably R is a hydrogen atom (—H) or a methyl group (—$CH_3$).

Most preferably the group represented by —OA in general formula (III) above is hydroxy (—OH), in which case A represents a hydrogen atom. But A may also represent a cement-compatible protecting group, in which case —OA is preferably hydrolysable to hydroxy under the alkaline conditions existing in a BCSAF cement mix after addition of water.

Most preferably, n represents the integer 2.

Note also that when n=2 in all of the groups of general formula III present in the molecule, the alkanolamine is herein called a "lower alkanolamine", and when n is greater than 2 in some or all of the groups of general formula III present in the molecule, the alkanolamine is herein called a "higher alkanolamine".

The alkanolamine is preferably a lower alkanolamine such as triethanolamine (TEA), diethanolamine (DEA), or methyl-diethanolamine (MDEA), more preferably DEA or MDEA. According to one embodiment of the invention, the alkanolamine is a either triethanolamine (TEA), diethanolamine (DEA), tetrakis-hydroxy-ethyl-ethylene-diamine (THEED), or methyl-diethanolamine (MDEA), or a mixture thereof.

The preferred alkanolamine according to the invention is DEA or MDEA.

The alkanolamine may be in the form of a free base or a salt thereof, for example an acetate, gluconate, sulphate, nitrate or chloride salt. When A is a protecting group it is preferably an alkanoyl group, for example of the formula R'CO in which R' represents a linear or branched chain alkyl group of 1 to 4 carbon atoms, preferably an acetyl group (in which R' represents methyl).

The alkanolamine could be according to a specific embodiment a higher alkanolamine like for example triisopropanolamine (TIPA).

The BCSAF cement composition according to the invention preferably comprises from 0.01 to 1% by weight, preferably from 0.03 to 0.3%, for example about 0.1% of alkanolamine.

The BCSAF cement composition according to the invention may further comprises a water-soluble calcium salt.

The term "water soluble calcium salt" as used in this specification including the accompanying claims refers to a calcium salt having a solubility in water at 25° C. of at least 100 g/l. The calcium salt preferably has a molecular weight less than 1000, more preferably less than 400. Calcium salts include the nitrite, nitrate, chloride, bromide, thiocyanate, formate, acetate and thiosulphate. Calcium nitrite and calcium nitrate are preferred The BCSAF cement composition according to the invention may preferably comprise from 0.1 to 10% by weight, preferably from 1 to 4%, for example about 2% of calcium salt (expressed as anhydrous salt).

The clinker in the BCSAF cement composition according to the invention preferably comprises one or more secondary elements selected from sulphur, magnesium, sodium, potassium, boron, phosphorus, zinc, manganese, titanium, fluorine and chlorine, present in the following quantities:
from 3 to 10% of sulphur expressed as sulphuric anhydride;
up to 5% of magnesium expressed as magnesium oxide;
up to 5% of sodium expressed as sodium oxide;
up to 5% of potassium expressed as potassium oxide;
up to 3% of boron expressed as boron oxide;
up to 7% of phosphorus expressed as phosphoric anhydride;
up to 5% of zinc, manganese, titanium or mixtures thereof, expressed as oxides of these elements;
up to 3% of fluorine, chlorine, or a mixture thereof, expressed as
calcium fluoride and calcium chloride;
the total content of the secondary elements, expressed as defined above, being less than or equal to 15%.

It will be understood that the sulphur content given above is the total sulphur present in the clinker.

Preferably, the clinker in the BCSAF cement composition according to the invention comprises as secondary
elements in the chemical formulation:
from 4 to 8% of sulphur expressed as sulphuric anhydride;
from 1 to 4% of magnesium, expressed as magnesium oxide;
from 0.1 to 2% of sodium, expressed as sodium oxide;
from 0.1 to 2% of potassium, expressed as potassium oxide;
up to 2% of boron, expressed as boron oxide;
up to 4% of phosphorus expressed as phosphoric anhydride;
up to 3% of zinc, manganese, titanium or a mixture thereof, expressed
as oxides of these elements;
up to 1% of fluorine, chlorine, or a mixture thereof, expressed as
calcium fluoride and calcium chloride.

More preferably, the clinker in the BCSAF cement composition according to the invention comprises as
secondary elements in the chemical formulation:
from 0.2 to 1% of sodium, expressed as sodium oxide;
from 0.2 to 1% of potassium, expressed as potassium oxide;
from 0.2 to 2% of boron, expressed as boron oxide;
a fluorine plus chlorine content less than or equal to 1%, expressed as
calcium fluoride and chloride.

The preferred secondary element in the clinker in the BCSAF cement composition according to the invention is boron which, introduced into the raw mix in the form of, for example, borax, encourages the formation of a belite α' phase during clinkering. The belite phase of the clinker is preferably partially or totally crystallised in the α' form. Preferably at least 50% by weight of the belite phase of the clinker is in the α' form.

The clinker preferably comprises at least the following main oxides present in the relative proportions expressed in % of the total weight of the clinker:
CaO: 50 to 61%
$Al_2O_3$: 9 to 22%
$SiO_2$: 15 to 25%
$Fe_2O_3$: 3 to 11%

By comparison with the alite phase ($C_3S$), the main component of Portland cements, a larger amount of belite phase ($C_2S$) in the clinker is beneficial. It leads to a reduction of energy consumption and of emissions of $CO_2$. Moreover, the belite contributes to the development of the long term strength of BCSAF cement.

The BCSAF clinker can be prepared by a process which comprises calcining, at a temperature of 1150° C. to 1350° C., preferably from 1220° C. to 1320° C., for at least 15 minutes in an atmosphere which is sufficiently oxidising to avoid substantial reduction of calcium sulphate present to produce sulphur dioxide:
a raw mix comprising a raw material or a mixture of raw materials able by clinkering to provide the phases $C_2A_xF_{(1-}$ $x_j$), wherein X is from 0.2 to 0.8, $C_4A_3\$$ and $C_2S$ in the required proportions; and, preferably one or more additives supplying a secondary element selected from sulphur, magnesium, sodium, potassium, boron, phosphorus, zinc, manganese, titanium, fluorine, chlorine, or a mixture thereof, in quantities calculated so that, after clinkering, the quantity corresponding to secondary elements, expressed as hereinbefore defined, is less than or equal to 15% by weight based on the total weight of clinker.

The emission of $CO_2$ is typically decreased by more than 20% with respect to that resulting from the clinkering of a typical Portland cement.

The raw materials used in the production of the clinker for use in the invention include phosphate limestone, magnesium limestone, clays, fly ash, hearth ash, fluidised bed ash, laterite, bauxite, red mud, slag, clinker, gypsum, desulphogypsum, phosphogypsum, desulphurisation mud, industrial slag, and mixtures thereof.

Additives supplying secondary elements can be raw materials themselves to the extent that they contain the required secondary elements in appropriate proportions or particular compounds of these secondary elements, for example oxides such as the oxides of sodium, potassium, magnesium, boron (particularly borax), zinc, magnesium, titanium, halides such as calcium fluoride and chloride and sulphates particularly calcium sulphate.

The term "additive supplying secondary elements" is to be understood to mean compounds which improve the clinkering capacity of the mixture of raw materials, and which stabilise a required crystalline form of one or more phases in order, for example to improve their reactivity.

According to a feature of the invention the cement composition according to the invention is prepared by grinding a BCSAF clinker, optionally with a water soluble calcium salt and/or an alkanolamine and, if necessary, adding to the ground clinker a water soluble calcium salt and/or an alkanolamine to produce a cement composition according to the invention.

The clinker may also be ground with, for example, a calcium sulphate (such as gypsum). When an excess of calcium sulphate is introduced into the raw mix in order to obtain anhydrite in the clinker, the cement can be prepared directly by grinding the clinker without additional gypsum. Preferably, the clinker is ground to a Blaine specific surface of more than 3000 $cm^2/g$, preferably more than 3500 $cm^2/g$.

The cement can comprise source materials of calcium sulphate and/or calcium oxide.

The cement composition according to the invention preferably comprises up to 15% by weight of the total weight of the cement, of a material selected from gypsum, anhydrite and hemihydrate.

The cement composition according to the invention preferably also comprises up to 30% by weight of the cement based on the total weight, of a filler (which may be, for example, inert or may be a supplementary cementitious material), for example at least one material selected from limestone, pozzolan, fly ash and blast furnace slag. When a filler is present the amount of calcium salt and alkanolamine is based on the amount of cement+filler.

The BCSAF cement composition composition according to the invention may also comprise an accelerator or retarder for setting and/or hardening. Setting retarders include gluconates, saccharides, phosphoric acid or carboxylic acid retarders or mixtures thereof.

When using the BCSAF cement composition composition according to the invention the water/cement ratio may be adjusted using, for example water-reducing agents and/or superplasticizers.

In the Concrete Admixtures Handbook, Properties Science and Technology, V.S. Ramachandran, Noyes Publications, 1984:

A water reducer is defined as an additive which reduces the amount of mixing water of concrete for a given workability by typically 10-15%. Water reducers include, for example lignosulphonates, hydroxycarboxylic acids, carbohydrates, and other specialized organic compounds, for example glycerol, polyvinyl alcohol, sodium alumino-methyl-siliconate, sulfanilic acid and casein.

Superplasticizers belong to a new class of water reducers chemically different from the normal water reducers and capable of reducing water contents by about 30%. The superplasticizers have been broadly classified into four groups: sulphonated naphthalene formaldehyde condensate (SNF) (generally a sodium salt); or sulphonated melamine formaldehyde condensate (SMF); modified lignosulfonates (MLS); and others. More recent superplasticizers include polycarboxylic compounds such as polyacrylates. The superplasticizer is preferably a new generation superplasticizer, for example a copolymer containing polyethylene glycol as graft chain and carboxylic functions in the main chain such as a polycarboxylic ether. Sodium polycarboxylate-polysulphonates and sodium polyacrylates may also be used. Phosphonic acid derivative superplasticizers may also be used. The amount of superplasticizer required generally depends on the reactivity of the cement. The lower the reactivity the lower the amount of superplasticizer required. In order to reduce the total alkali content the superplasticizer may be used as a calcium rather than a sodium salt. These admixtures are commercially available products. Examples include the products OPTIMA 100® and OPTIMA 175®, marketed by CHRYSO®.

The cement compositions according to the invention may be used in construction or in the production of prefabricated units.

The present invention also provides a slurry, a concrete or a mortar comprising a belite-BCSAF cement composition according to the invention and a process for their preparation. The water to cement (W/C) ratio is generally $\leq 1$, for example 0.1 to 1, preferably 0.3 to 0.8, e.g. about 0.5.

The invention also provides a process for the preparation of a slurry, a concrete or a mortar which comprises mixing a BCSAF cement with an alkanolamine.

The process of the invention may further comprise a step of addition of a water soluble calcium salt.

The invention also provides a product comprising an alkanolamine for simultaneous, separate or sequential use in the preparation of a cement composition or a slurry, mortar or concrete according to the invention.

The invention also concerns the use of an alkanolamine to increase compressive strength of mortar and concrete containing BCSAF cement at later ages, preferably greater than 30 days-old, most preferably greater than 60 days-old, even more preferably greater than 90 days-old.

The invention also concerns the use of triethanolamine (TEA), diethanolamine (DEA), tetrakis-hydroxy-ethyl-ethylene-diamine (THEED), or methyl-diethanolamine (MDEA), or a mixture thereof to increase compressive strength of mortar and concrete containing BCSAF cement at later ages, preferably greater than 30 days-old, most preferably greater than 60 days-old, even more preferably greater than 90 days-old. The use of diethanolamine (DEA) or methyldiethanolamine (MDEA) is preferred.

The invention also concerns the use of diethanolamine (DEA) or methyldiethanolamine (MDEA) to increase compressive strength of mortar and concrete containing BCSAF cement at 90 days. The invention also concerns the use of an alkanolamine with a water soluble calcium salt to increase compressive strength of mortar and concrete containing BCSAF cement at later ages, preferably greater than 30 days-old, most preferably greater than 60 days-old, even more preferably greater than 90 days-old.

The invention also concerns the use of a water soluble calcium salt with triethanolamine (TEA), diethanolamine (DEA), tetrakis-hydroxy-ethyl-ethylene-diamine (THEED), or methyl-diethanolamine (MDEA), triisopropanolamine (TIPA) or a mixture thereof to increase compressive strength of mortar and concrete containing BCSAF cement at later ages, preferably greater than 30 days-old, most preferably greater than 60 days-old, even more preferably greater than 90 days-old.

In this specification, including the accompanying claims, unless otherwise specified, percentages are by weight.

The invention is illustrated by the following Examples.

EXAMPLE 1

A standard mortar was prepared in accordance with EN 196 using the following ingredients:

| | |
|---|---|
| BCSAF cement (batch n° 1) | 450 g |
| Water | 225 g |
| Standard Sand | 1350 g |

The BCSAF cement was prepared as described in Example 6, for clinker 2 in Table 7 of US-A-20070266903.

An alkanolamine, (triethanolamine (TEA) or triisopropanolamine (TIPA)) and/or calcium nitrite were included in mortar samples in the amounts indicated in Table 1 below to produce mortars 1 to 12. The amount of calcium salt is expressed as % dry mass/cement. The amount of alkanolamine is expressed as % per mass of cement.

The compressive strength of the mortars thus obtained was measured on 4×4×16 cm³ prismatic test specimens prepared at 20° C. using metal moulds. The test specimens were stored in water at 20° C. for 7 or 28 days until measurement of compressive strength.

The results obtained are shown in Table 1.

TABLE 1

| | | | Compressive strength | | |
|---|---|---|---|---|---|
| Mortar Number | Calcium nitrite | Alkanolamine | 7 days | 28 days | 90 days |
| 1 | — | — | 29 | 32 | — |
| 2 | — | 0.1% TIPA | 30 | 34 | — |
| 3 | — | 0.1% TEA | 29 | 36 | — |
| 4 | 1% | — | 29 | 32 | 51 |
| 5 | 1% | 0.1% TIPA | 31 | 34 | 59 |
| 6 | 1% | 0.1% TEA | 29 | 34 | 65 |
| 7 | 2% | — | 31 | 35 | 39 |
| 8 | 2% | 0.1% TIPA | 33 | 36 | 68 |
| 9 | 2% | 0.1% TEA | 34 | 41 | 67 |
| 10 | 4% | — | 35 | 42 | 45 |
| 11 | 4% | 0.1% TIPA | 34 | 42 | 73 |
| 12 | 4% | 0.1% TEA | 36 | 46 | 76 |

The TEA or TIPA alone have little or no effect on 7 day compressive strengths but increase 28 day values, with TEA giving the greater effect of the two.

The calcium nitrite alone increases both 7 and 28 day compressive strengths with increasing concentration.

When both alkanolamine and calcium nitrite are present the 7 day strength is increased with increasing calcium nitrite concentration. The 28 day compressive strengths are also substantially increased. In addition, TEA is notably more effective than TIPA as a strength enhancer in BCSAF cement, whereas in Portland cement mortars TIPA is far more effective than TEA.

The 90 day strengths using alkanolamine and calcium nitrite are greatly increased compared with the calcium nitrite alone.

EXAMPLE 2

An EN 196 standard mortar was prepared using the following ingredients:

| | |
|---|---|
| BCSAF cement (batch n° 1): | 315 g |
| Limestone filler: | 135 g |
| Water: | 225 g |
| Sand: | 1350 g |

(note: for the purpose of the EN 196 mortar formulation, the limestone filler is considered as part of the cement, such that the total cement content is still 450 g)

An alkanolamine, triethanolamine (TEA) or triisopropanolamine (TIPA) and/or calcium nitrite or nitrate were included in mortar samples in the amounts indicated in Table 2 below to produce mortars 13 to 21. The amount of calcium salt is expressed as % dry mass/(cement+filler). The amount of alkanolamine is expressed as % per mass of cement+filler.

The compressive strength of the mortars thus produced was tested using the procedure described in Example 1.

The results obtained are shown in Table 2.

TABLE 2

| | | | Compressive strength | | |
|---|---|---|---|---|---|
| Mortar Number | Calcium nitrite | Alkanolamine | 7 days | 28 days | 90 days |
| 13 | — | — | 15 | 17 | — |
| 14 | 1% | — | 17 | 19 | 21 |
| 15 | 1% | 0.1% TEA | 15 | 20 | 24 |
| 16 | 2% | — | 17 | 20 | 23 |
| 17 | 2% | 0.1% TEA | 16 | 21 | 25 |
| 18 | 4% | — | 18 | 21 | 22 |
| 19 | 4% | 0.1% TEA | 17 | 25 | 35 |
| 20 | Calcium nitrate 7.1% | — | 21 | 22 | — |
| 21 | 7.1% | 0.1% TEA | 22 | 27 | — |

The dosage of calcium nitrate in mortar numbers 20 and 21 is equivalent, on a molar basis relative to cement+filler to the 4% dosage of calcium nitrite used in mortar numbers 18, and 19. The calcium nitrite was added as a concentrated solution. Calcium nitrite (anhydrous) has a molar weight of 138 g. Calcium nitrate was added as powdered tetrahydrate (molar weight 236 g).

The amount of each salt added per 100 g of cement+filler was:

Calcium nitrite: 4/132 = 30 mmol;
Calcium nitrate: 7.1/236 = 30 mmol.

The calcium nitrite or calcium nitrate alone increases both 7 and 28 day compressive strengths. When both alkanolamine and calcium nitrite or nitrate are present the 7 day strength is unaffected or slightly increased. The 28 day compressive strengths are substantially increased. However in contrast to their relative activities to increase the compressive strength of Portland cement mortars (in which TIPA is more effective than TEA) TEA is more effective than TIPA.

EXAMPLE 3

A standard mortar was prepared in accordance with EN 196 using the following ingredients:

BCSAF cement (batch n° 2): 337.5 g
Limestone filler: 112.5 g
Water: 225 g
Sand: 1350 g (note: for the purpose of the EN 196 mortar formulation, the limestone filler is considered as part of the cement, such that the total cement content is still 450 g)

Alkanolamines, with or without calcium nitrite or nitrate, were included in mortar samples in the amounts indicated in Table 3 below to produce mortars 22 to 30. The amount of calcium salt is expressed as % dry mass/(cement+filler). The amount of alkanolamine is expressed as % per mass of cement+filler.

The compressive strength of the mortars thus produced was tested using the procedure described in Example 1. The results obtained are shown in Table 3.

TABLE 3

| Mortar number | Calcium nitrate | Alkanolamine | Compressive strength (MPa) | |
|---|---|---|---|---|
| | | | 28 days | 90 days |
| 22 | — | — | 22.4 | 24.2 |
| 23 | 3% | 0.1% TEA | 27.1 | 30 |
| 24 | — | 0.1% DEA | 23.3 | 32.7 |
| 25 | 3% | 0.1% DEA | 26.1 | 29.1 |
| 26 | — | 0.1% MDEA | 25 | 31.7 |
| 27 | 3% | 0.1% MDEA | 27.1 | 28.3 |
| 28 | — | 0.1% THEED | 24 | 25.5 |
| 29 | 3% | 0.1% THEED | 27.1 | 28.5 |
| 30 | 3% | 0.1% TIPA | 24.7 | 27.4 |

In the absence of calcium nitrate, MDEA gives the greatest strength enhancement at 28 days, and DEA gives the greatest strength enhancement at 90 days.

In the presence of calcium nitrate, all of the alkanolamines give good strength enhancements at both 28 and 90 days.

The invention claimed is:

1. A belite-calcium sulphoaluminate-ferrite (BCSAF) cement composition comprising:
   a BCSAF clinker which clinker includes the following mineralogical composition, based on the total weight of the clinker:
   5 to 30% of a calcium aluminoferrite phase having the general formula $C_2A_xF_{(1-x)}$, wherein X is from 0.2 to 0.8;
   10 to 35% of a calcium sulphoaluminate phase;
   40 to 75% of belite ($C_2S$);
   from 0.01 to 10% in total of one or more minor phases selected from calcium sulphates, alkali metal sulphates, perovskite, calcium aluminates, gehlenite, free lime and periclase and/or a vitreous phase;
   an alkanolamine, and
   a water-soluble calcium salt.

2. The composition according to claim 1, wherein the calcium salt has a solubility in water at 25° C. of at least 100g/liter.

3. The composition according to claim 1, wherein the calcium salt is calcium nitrite.

4. The composition according to claim 2, wherein the calcium salt is calcium nitrate.

5. The composition according to claim 1, wherein the alkanolamine has the general formula:

$$NX_pR_{(3-p)} \quad (I)$$

in which p represents an integer from 1 to 3, R represents a hydrogen atom or an alkyl group of general formula:

$$-C_qH_{2q+1} \quad (II)$$

in which q represents an integer from 1 to 5;
X represents a group of the general formula:

$$-(C_nH_{2n})-OA \quad (III)$$

in which n is an integer from 2 to 5 and $-(C_nH_{2n})-$ may be linear or branched;
or X represents a group of the general formula:

$$-(C_mH_{2m})-NY_tR_{(2-t)} \quad (IV)$$

in which m is an integer from 2 to 5, Y represents a group of general formula (III) as hereinbefore defined, t is 1 or 2 and the $-(C_mH_{2m})-$ may be linear or branched.

6. The composition according to claim 5, wherein the alkanolamine is either triethanolamine (TEA), diethanolamine (DEA), tetrakis-hydroxy-ethyl-ethylene-diamine (THEED), or methyl-diethanolamine (MDEA), or a mixture thereof.

7. The composition according to claim 1, comprising from 0.01 to 1% by weight of alkanolamine.

8. The composition according to claim 7, comprising from 0.03 to 0.3% by weight of alkanolamine.

9. The composition according to claim 1, wherein the BCSAF clinker includes 10 to 20% of a calcium aluminoferrite phase.

10. The composition according to claim 1, wherein the BCSAF clinker comprises one or several secondary elements selected from the group consisting of sulphur, magnesium, sodium, potassium, boron, phosphorus, zinc, manganese, titanium, fluorine, chlorine, present in the following quantities:
   from 3 to 10% of sulphur expressed as sulphuric anhydride,
   up to 5% of magnesium expressed as magnesium oxide,
   up to 5% of sodium expressed as sodium oxide,
   up to 5% of potassium expressed as potassium oxide,
   up to 3% of boron, expressed as boron oxide,
   up to 7% of phosphorus expressed as phosphoric anhydride,
   up to 5% of zinc, manganese, titanium or mixtures thereof, expressed as oxides of these elements,
   up to 3% of fluorine, chlorine, or mixtures thereof, expressed as calcium fluoride and calcium chloride, the total content of said one or several secondary elements being less than or equal to 15%.

11. A slurry, mortar or concrete comprising a BCSAF cement composition according to claim 1.

12. A process for the preparation of a slurry, mortar or concrete, comprising mixing a belite-calcium sulphoaluminate-ferrite (BCSAF)clinker with an alkanolamine and a water-soluble calcium salt, the BCSAF clinker including the following mineralogical composition, based on the total weight of the clinker:
- 5 to 30% of a calcium aluminoferrite phase having the general formula $C_2A_xF_{(1-x)}$, wherein X is from 0.2 to 0.8;
- 10 to 35% of a calcium sulphoaluminate phase;
- 40 to 75% of belite ($C_2S$);
- from 0.01 to 10% in total of one or more minor phases selected from calcium sulphates, alkali metal sulphates, perovskite, calcium aluminates, gehlenite, free lime and periclase and/or a vitreous phase.

13. A method comprising adding an alkanolamine and a water-soluble calcium salt to mortar and concrete containing BCSAF cement to increase compressive strength of said mortar and concrete containing BCSAF cement at 28 days or 90 days or both.

14. The method according to claim 13, wherein the alkanolamine is added to increase compressive strength at 90 days.

15. The method according to claim 13, wherein the alkanolamine is added simultaneously, separately or sequentially to mortar and concrete containing BCSAF.

16. A method comprising adding diethanolamine (DEA) or methyldiethanolamine (MDEA) and a water-soluble calcium salt to mortar and concrete containing BCSAF cement to increase compressive strength of said mortar and concrete containing BCSAF cement at 28 days or 90 days or both.

17. The method according to claim 16, wherein the diethanolamine (DEA) or methyldiethanolamine (MDEA) is added to increase compressive strength at 90 days.

* * * * *